United States Patent Office 2,945,050
Patented July 12, 1960

2,945,050
OXIDATION PROCESS

Norman W. Franke, Penn Township, Allegheny County, Charles M. Selwitz, Monroeville, and Arthur C. Whitaker, Pittsburgh, Pa., assignors to Gulf Research & Development Company, Pittsburgh, Pa., a corporation of Delaware No Drawing. Filed May 21, 1957, Ser. No. 660,466

3 Claims. (Cl. 260—413)

This invention relates to a process for preparing acids and more specifically to a process of oxidizing by-products of the Oxo process with nitric acid to obtain a product containing fatty acids.

The production of oxygenated organic compounds by reaction of olefins with hydrogen and carbon monoxide in the Oxo process is of course well known. In the first stage of the process, equal molar amounts of an olefin, such as heptene, carbon monoxide and hydrogen are reacted in the presence of a metallic hydroformylation reaction catalyst, such as cobalt 2-ethyl hexanoate, at a temperature of about 150° to about 450° F. and a pressure of about 1500 to about 5000 pounds per square inch for a period of about 10 to about 60 minutes to obtain a hydroformylation reaction product predominating in an aldehyde having one carbon more than the olefin in the charge. Generally the hydroformylation product obtained is then treated to remove therefrom the dissolved hydroformylation reaction catalyst, which at such point is in the form of a metal carbonyl such as cobalt carbonyl. This can be effected, for example by the mere expedient of heating the hydroformylation reaction product to a temperature of about 200° to about 400° F. and a pressure of about 150 to about 250 pounds per square inch and thereby decomposing the metal carbonyl. After the metal carbonyl has been removed from the hydroformylation reaction product, it is sent to a hydrogenation reactor packed with a hydrogenation catalyst, such as nickel, where at a temperature of about 400° to about 500° F. and a pressure of about 500 to about 1500 pounds per square inch the aldehyde in the hydroformylation reaction product is converted to the corresponding alcohol.

Unfortunately, not only are aldehydes and alcohols produced in the Oxo process, but many other organic compounds which cannot easily be recovered as separate entities are also obtained. Thus in the hydroformylation reaction zone, polymerization and decomposition products, ketones, acetals, hemiacetals and esters are produced in addition to the desired aldehydes. When the hydrogenation product containing the alcohols is subjected to distillation with open reboiler steam at a temperature of about 100° to about 500° F. and a pressure of about one to about 20 pounds per square inch absolute, an overhead product consisting of the desired alcohol is obtained and a bottom fraction comprising the ordinarily undesirable products noted above is left behind. The latter fraction, called "Oxo bottoms," which in many cases amounts to about two to about 15 percent by weight of the charge to the distillation zone, is generally of little commercial value.

We have found that the Oxo bottoms can be rendered commercially attractive and a product comprising fatty acids can be obtained therefrom by the expedient of oxidizing the same with nitric acid under closely controlled reaction conditions.

As charged stock for the reaction, that part of the hydrogenation product obtained in the Oxo process remaining as bottoms after recovery of the desired alcohol fraction can be employed, desirably the bottoms remaining after distillation of the alcohol product obtained in accordance with the Oxo process wherein the olefin charged to the hydroformylation reaction stage is a $C_4$ to $C_{16}$ olefin. A typical Oxo bottom product which can be employed satisfactorily in the present process would have the following analysis:

| | Percent by weight |
|---|---|
| Eight carbon compounds: | |
| Isooctyl alcohol | 27.2 |
| Sixteen carbon compounds: | |
| Isohexadecyl aldehyde | 6.3 |
| Isohexadecyl alcohol | 18.8 |
| Isooctyl isooctanoate | 3.6 |
| Diisooctyl ether | 5.6 |
| Hemiacetal | 5.2 |
| Aldol | 0.3 |
| Ketoaldehyde | 1.4 |
| Glycol | 8.3 |
| Isohexadecanoic acid | 0.3 |
| Twenty-four carbon compounds: | |
| Isotetracosyl aldehyde | 0.6 |
| Ester | 7.8 |
| Diether | 3.8 |
| Higher boiling polymers | 6.3 |

The concentration of nitric acid as well as the amount employed in the present oxidation process is extremely important. Nitric acid having a concentration of about 20 to about 90 percent can be used, although a concentration of about 50 to about 70 percent is preferred in order to effect the oxidation in a reasonable length of time without appreciable degradation of the fatty acids obtained. The concentration of the nitric acid need not be constant during the reaction period but can be varied as desired. Thus, in a first stage the Oxo bottoms can be oxidized with nitric acid having a lower concentration of about 20 to about 50 percent, and the refractory, unconverted material effluent from the first stage can be treated with a more highly concentrated nitric acid of about 50 to about 90 percent. In order to obtain satisfactory yields in a reasonable length of time, we have found that about 0.25 to about 5 parts by weight of nitric acid, preferably about one to about 4 parts by weight of nitric acid, per part of the Oxo bottoms defined above can be used.

While the oxidation can be conducted at a temperature of about 25° to about 150° C., we have found that in order to facilitate the oxidation reaction a temperature of about 50° to about 100° C. is preferred.

The pressure at which the reaction can be carried out is not critical, and it has been found that pressures of about atmospheric to about 1500 pounds per square inch, preferably about 500 to about 1000 pounds per square inch are extremely satisfactory.

The time necessary to obtain excellent yields of fatty acids from Oxo bottoms by oxidation with nitric acid, though not critical, should be at least about 3 minutes and preferably about one-tenth to about 4 hours.

The nitric acid oxidation can be carried out satisfactorily with or without catalysts. Catalysts can be used, when desired, to speed the oxidation reaction. Catalysts which can be used include vanadium pentoxide, cobalt oleate, cobalt stearate, copper stearate, manganese stearate, etc. The amount of catalyst used amounts to about 0.01 to about 5 percent by weight based upon the original charge.

The reaction mixture obtained contains fatty acids, nitric acid, dibasic acids, nitro acids and hydroxy acids. In order to effect separation of the fatty acids from the reaction mixture, any convenient method can be employed. The reaction mixture comprises two layers, an upper organic layer containing the oxidized material and a lower layer comprising nitric acid. Thus, the two layers can be separated by decantation and the organic layer washed with an aqueous solution such as water to remove nitric acid and other water-soluble materials therefrom, and thereafter distilled at a suitable temperature. For example, for a $C_5$ acid a temperature of about 170° C. at 760 mm. of mercury is suitable, while a temperature of about 227° C. and a pressure of 100 mm. of mercury would be satisfactory for a $C_{17}$ acid.

The fatty acids produced in accordance with the present process can be employed to make esters for solvents or lubricants.

The invention can be further illustrated by reference to the following examples.

Example I 32 standard cubic feet per hour of hydrogen and carbon monoxide in a molar ratio of 1.1 to 1 were passed together with 0.475 gallon per hour of heptene and 0.046 pound per hour of the cobalt salt of 2-ethylhexanoic acid through an elongated coil having an internal diameter of 0.302 inch and a length of 365 feet which was maintained under a pressure of 3500 pounds per square inch and a temperature of 350° F. At the end of 45 minutes a product containing 55 percent by weight of isooctylaldehyde contaminated with the cobalt carbonyl catalyst was obtained. This product was subsequently heated to a temperature of 380° F. to decompose and remove the dissolved cobalt carbonyl, and the substantially metal-free product together with 90 standard cubic feet per hour of hydrogen was passed to a hydrogenation tower having a height of 11.5 feet and an internal diameter of 1.6 inches and packed with nickel in particulate form. The temperature therein was 400° F. and the pressure about 1000 pounds per square inch. At the end of 60 minutes 1600 grams of a hydrogenation product was obtained. This product was distilled at a temperature of 330° F. and a pressure of 14.7 pounds per square inch continuously and 1520 grams of an overhead product consisting of isooctyl alcohol and 80 grams of a residue fraction having the following analysis were obtained.

|  | Percent by weight |
|---|---|
| Eight carbon compounds: |  |
| Isooctyl alcohol | 27.2 |
| Sixteen carbon compounds: |  |
| Isohexadecyl aldehyde | 6.3 |
| Isohexadecyl alcohol | 18.8 |
| Isooctyl isooctanoate | 3.6 |
| Diisooctyl ether | 5.6 |
| Hemiacetal | 5.2 |
| Aldol | 0.3 |
| Ketoaldehyde | 1.4 |
| Glycol | 8.3 |
| Isohexadecanoic acid | 0.3 |
| Twenty-four carbon compounds: |  |
| Isotetracosyl aldehyde | 0.6 |
| Ester | 7.8 |
| Diether | 3.8 |
| Higher boiling polymers | 6.3 |

To a 3-neck, 2-liter round bottom flask containing one liter of 50 percent nitric acid and one gram of vanadium pentoxide was added dropwise over a five-hour period 150 grams of an Oxo bottom fraction such as that obtained above. The reaction mixture was stirred and maintained at 55° C. and atmospheric pressure throughout the reaction period. The product obtained comprised two layers, 151 grams of an upper organic layer and a lower nitric acid layer. The upper organic layer was removed from the product by decantation and washed with water to remove any nitric acid which would be present, leaving a raffinate which weighed 125.4 grams. The raffinate was distilled and 51.8 grams of isooctanoic acid were recovered in the range 428° to 445° F.

That the present oxidation process can be carried out at elevated pressures is shown below in Examples II, III, IV and V.

Example II 111 grams of the Oxo bottom product used in Example I was combined with 560 grams of nitric acid having a concentration of 65 percent and the mixture pressured with air to 1000 pounds per square inch. The mixture was heated for 2 hours at a temperature of 110° C. 48 grams of isooctanoic acid and isohexadecanoic acid were obtained.

Example III

The run of Example II was repeated except that the concentration of the nitric acid was 60 percent, the temperature of the reaction 90° C. and the reaction time one-half hour. 40 grams of isooctanoic acid were obtained.

Example IV

The run of Example II was again repeated except that the reaction time was extended to three-quarters of an hour. 47 grams of isooctanoic acid were obtained.

Example V

The run of Example II was again repeated except that the reaction time was extended to 3 hours. 53 grams of isooctanoic acid were obtained.

While in each of the above examples, the bottoms fraction employed was the residue resulting from the distillation of an alcohol obtained in the Oxo process where heptene was the olefin hydroformylated and the aldehyde obtained converted to the corresponding alcohol, the bottoms fraction resulting from the ultimate conversion of other olefins such as $C_4$ to $C_{16}$ olefins, to alcohols in accordance with such process can similarly be converted by the present process to a product containing fatty acids. Not only can Oxo bottoms as such be used in the present process but also a mixture of the components found in Oxo bottoms can be employed, though such components may not have been produced in the Oxo process.

Obviously, many modifications and variations of the invention, as hereinabove set forth, can be made without departing from the spirit and scope thereof, and therefore only such limitations should be imposed as are indicated in the appended claims.

We claim:

1. A process for preparing fatty acids which comprises reacting an olefin with hydrogen and carbon monoxide in the presence of a metallic hydroformylation reaction catalyst at an elevated temperature and an elevated pressure to obtain a mixture containing an aldehyde having one more carbon atom than said olefin, removing the hydroformylation reaction catalyst from said mixture, subjecting said demetalled mixture to hydrogenation to convert said aldehyde to the corresponding alcohol, recovering desired alcohol from the hydrogenated mixture, oxidizing the remainder of said hydrogenated mixture with nitric acid to obtain a reaction mixture comprising an organic layer containing fatty acids and a nitric acid layer and thereafter separating said layers from each other in order to recover said organic layer.

2. A process for preparing fatty acids which comprises reacting an olefin with hydrogen and carbon monoxide in the presence of a metallic hydroformylation reaction catalyst at an elevated temperature and an elevated pressure to obtain a mixture containing an aldehyde having one more carbon atom than said olefin, removing the hydroformylation reaction catalyst from said mixture, subjecting said demetalled mixture to hydrogenation to convert said aldehyde to the corresponding alcohol, recovering desired alcohol from the hydrogenated mixture, oxidizing the remainder of said hydrogenated mixture with nitric acid to obtain a reaction mixture comprising an organic layer containing fatty acids and a nitric acid layer, separating said layers from each other and thereafter subjecting said organic layer to distillation to recover said fatty acids therefrom.

3. A process for preparing fatty acids which comprises reacting an olefin with hydrogen and carbon monoxide in the presence of a metallic hydroformylation reaction catalyst at an elevated temperature and an elevated pressure to obtain a mixture containing an aldehyde having one more carbon atom than said olefin, removing the hydroformylation reaction catalyst from said mixture, subjecting said demetalled mixture to hydrogenation to convert said aldehyde to the corresponding alcohol, recovering desired alcohol from the hydrogenated mixture, oxidizing the remainder of said hydrogenated mixture with nitric acid to obtain a reaction mixture comprising an organic layer containing fatty acids and a nitric acid layer, separating said layers from each other, washing said organic layer with an aqueous solution and thereafter subjecting said washed organic layer to distillation to recover said fatty acids therefrom.

References Cited in the file of this patent

UNITED STATES PATENTS

| | | |
|---|---|---|
| 2,365,290 | Price et al. | Oct. 15, 1941 |
| 2,426,954 | Sprules | Sept. 2, 1947 |
| 2,537,577 | Fasce | Jan. 9, 1951 |
| 2,594,341 | Owen et al. | Apr. 29, 1952 |
| 2,648,694 | Mason | Aug. 11, 1953 |
| 2,802,846 | Mertzweiller | Aug. 13, 1957 |